Patented Mar. 8, 1927.

1,620,212

UNITED STATES PATENT OFFICE.

FÉLIX JOURDAN, OF ROME, ITALY.

PROCESS FOR THE TREATMENT OF LEUCITE AND OTHER SODIUM AND POTASSIUM SILICATES WITH LIME FOR THE PURPOSE OF EXTRACTING POTASSIUM OR SODIUM AND ALUMINUM VALUES.

No Drawing. Application filed December 27, 1924, Serial No. 758,455, and in Italy December 28, 1923.

It is known that, if leucite is mixed with lime or with calcium carbonate and the mixture is heated until it reaches the melting temperature, there is obtained therefrom a pasty or liquid mass, which, when certain determined proportions of lime and leucite and a certain duration of the action are maintained, after having been cooled and powdered and upon being lixiviated, preferably with warm water sets free aluminum and potassium in the form of aluminate of potassium.

The application of the same process in connection with sodium leucite permits one to obtain soda and aluminum in the form of aluminate of sodium.

In general the process may also be more or less suitably adopted in connection with other ores consisting substantially of silicates of aluminum and of potassium or of sodium.

When applied to potassium leucite said process may be carried out in the following manner:

The lime or the limestone is powdered or very finely granulated and mixed with the leucite in proportions which, according to the composition of the leucite treated, vary between 70 and 120 parts of lime for 100 parts of leucite.

This mixture either as it is or after having been previously sintered into small lumps is burnt in a furnace of any convenient kind, such as lime furnace, reverberatory furnace, rotary furnace etc., capable of raising the temperature of the material up to 1000° or 1400° C.

The melting is facilitated by adding to the mixture of lime and leucite a suitable flux, and it has been ascertained that the use of carbonate of iron in the proportion of 5 to 15% has proved to be very convenient.

As flux, instead of carbonate of iron, may also be employed ferric oxide $Fe_2O_3$, but in this case it is necessary to add a small quantity of coal.

The walls of the furnace are to be provided with a lining of lime, magnesia or any other refractory alkaline material.

The gases escaping from the furnace are collected and filtered for the purpose of recovering the potassium that may have volatilized and of utilizing the carbonic acid contained therein.

After melting the product upon having been cooled down is either ground or, when leaving the furnace, it is powdered by means of a blowing action performed with air free from carbonic acid.

The powder thus obtained is lixiviated, preferably by treating it hot and by employing processes permitting one to secure the greatest saturation with the aluminate of potassium, the wash water being again utilized for the lixiviation of fresh material.

The solution of aluminate separated through filtration and suitably enriched is treated with carbonic acid anhydride, and in connection with this treatment may be utilized the carbonic acid anhydride produced during the transformation of calcium carbonate into lime. In this way is obtained the formation of carbonate of potassium or of carbonate of sodium, if a sodium leucite has been treated, and the precipitation of alumina in a pure state, which is separated through filtration.

The economical value of the aforesaid process, from the industrial standpoint, chiefly depends upon the yield of potash obtainable through lixiviation of the powder of the molten material, and upon the cost involved with powdering this material.

For the purpose of diminishing or even entirely eliminating the cost involved with the powdering operation it would appear to be convenient, instead of grinding the molten material after cooling, to powder it by causing it to undergo a blowing action while it is still in a liquid condition when leaving the furnace.

However, practical experiments have proved that the powdering process performed by adopting the blowing action from the standpoint of the yield is not convenient inasmuch as it has been ascertained that the same is always considerably lower than the yield of soluble potash which is obtained by firstly casting the molten product and then by grinding it after solidification.

The differences ascertained are very great inasmuch as the yield of the material powdered through blowing action amounts to about 12%, while the yield of the cast and then ground material surpasses even 90%.

A more accurate investigation of the circumstances exerting an influence upon the value of the yield has proved that the yield of soluble potash is so much the greater the slower the cooling operation proceeds. Consequently, if the powdering is performed through blowing action, in which case the cooling takes place quite suddenly and immediately, the yield is extremely low and nearly naught. In fact, the molten product thus cooled assumes a glassy appearance and through lixiviation it no longer supplies any soluble aluminate.

As far as concerns the product molten and cooled down after casting, it has, as already stated above, been ascertained that the quantity of soluble aluminate which may be obtained increases by the slowing down of the cooling action and consequently the cast lumps have a greater volume. Upon testing the samples of a lump cooled down in a mould or in a furnace it will be found that, as already stated above, the yield with the samples taken out from the center of the mass is greater than with the samples taken from the periphery, that is with those contacting with the walls where the cooling action proceeds more speedily.

Moreover, with these tests has been ascertained another very important and unexpected circumstance, namely that the material cast in thick masses and cooled down slowly falls into powder by itself and that the naturally powdered quantity is so much the greater the slower proceeds the cooling action.

When treating masses of a few hundred kilograms by cooling them down slowly in two or three days, the whole material falls completely into powder and the yield of soluble potash rises as far as to reach about 95%.

Consequently, it is unnecessary, even from the standpoint of the milling expenses, to take into consideration the convenience of powdering the material through a sudden cooling operation performed by means of a blowing action.

Claim—

The process of producing potash and alumina from leucite treated with lime at a high temperature, until the mixture is caused to melt, which process consists in so casting the molten product that it will form big lumps, and then cooling these down in such a way as to cause them to disintegrate into a powdery mass.

In testimony whereof I have affixed my signature.

FÉLIX JOURDAN.